US011517139B2

(12) United States Patent
Abbatangelo et al.

(10) Patent No.: US 11,517,139 B2
(45) Date of Patent: Dec. 6, 2022

(54) METHODS OF RECOGNIZING TYPES OF COFFEE

(71) Applicant: Gruppo Cimbali S.p.A., Binasco (IT)

(72) Inventors: Marco Abbatangelo, Binasco (IT); Giorgio Duina, Binasco (IT); Elisabetta Comini, Binasco (IT); Giorgio Sberveglieri, Binasco (IT); Veronica Sberveglieri, Binasco (IT); Alberto Galimberti, Binasco (IT); Claudio Volonté, Binasco (IT)

(73) Assignee: GRUPPO CIMBALI S.p.A., Binasco (IT)

(*) Notice: Subject to any disclaimer, the term of this patent is extended or adjusted under 35 U.S.C. 154(b) by 179 days.

(21) Appl. No.: 16/874,160

(22) Filed: May 14, 2020

(65) Prior Publication Data

US 2020/0359830 A1     Nov. 19, 2020

(30) Foreign Application Priority Data

May 15, 2019   (IT) .......................... 102019000006877

(51) Int. Cl.
*A47J 31/42* (2006.01)
*A47J 31/52* (2006.01)
(Continued)

(52) U.S. Cl.
CPC .................. *A47J 31/42* (2013.01); *A23F 5/08* (2013.01); *A23F 5/26* (2013.01); *A47J 31/525* (2018.08); *A47J 42/44* (2013.01); *A47J 42/50* (2013.01)

(58) Field of Classification Search
CPC ..... A23F 5/08; A23F 5/26; A47J 42/44; A47J 42/50

See application file for complete search history.

(56) References Cited

U.S. PATENT DOCUMENTS

2009/0220645 A1* 9/2009 Martinez ................... A23F 5/02
                                                        426/45
2017/0276627 A1* 9/2017 Dobrokhotov et al. .....................
                                                      G01N 27/12
                                                        422/90

(Continued)

FOREIGN PATENT DOCUMENTS

CN       106136907 A    11/2016
EP         2314188 B1   10/2012
(Continued)

OTHER PUBLICATIONS

Translation for RU2502997 published Dec. 2013.*
(Continued)

*Primary Examiner* — Anthony J Weier
(74) *Attorney, Agent, or Firm* — MH2 Technology Law Group LLP (57) ABSTRACT

A method of recognizing a type of coffee from reference types of coffee, wherein each of the reference types of coffee is associated with a respective reference signal and wherein each type of coffee is associated to a characteristic combination of volatile organic compounds released from the type of coffee, may include: sensing, by one or more sensors, presence and concentration of one or more volatile organic compounds in a mixture of volatile organic compounds released from the type of coffee; generating a signal representative of the type of coffee according to the sensed one or more volatile organic compounds and the respective concentrations of the sensed one or more volatile organic compounds; comparing the generated signal with the reference signal associated with each of the reference types of coffee; and generating a recognition signal in response to the comparing of the generated signal with the reference signals.

20 Claims, 4 Drawing Sheets

(51) Int. Cl.
    *A47J 42/50*     (2006.01)
    *A47J 42/44*     (2006.01)
    *A23F 5/08*     (2006.01)
    *A23F 5/26*     (2006.01)

(56) References Cited

U.S. PATENT DOCUMENTS

| | | | | |
|---|---|---|---|---|
| 2017/0303731 A1* | 10/2017 | Tan | ............ | A23F 5/26 |
| 2017/0319002 A1* | 11/2017 | Tan | ............ | A23F 5/04 |
| 2018/0055288 A1* | 3/2018 | Rose | ............ | A47J 42/40 |
| 2021/0405010 A1* | 12/2021 | Galimberti | ............ | A23F 5/08 |

FOREIGN PATENT DOCUMENTS

| | | | |
|---|---|---|---|
| RU | 2502997 | * | 12/2013 |
| WO | 2016075147 A1 | | 5/2016 |

OTHER PUBLICATIONS

Suslick et al. Anal. Chem. 2010. vol. 82. pp. 2067-2073.*
Italian Search Report and Written Opinion in corresponding Italian Application No. 102019000006877, dated Jan. 20, 2020, 7 pages.

* cited by examiner

Fig. 4

METHODS OF RECOGNIZING TYPES OF COFFEE

CROSS-REFERENCE TO RELATED APPLICATION(S)

This application claims priority under 35 U.S.C. § 119 from Italian Patent Application No. 102019000006877, filed on May 15, 2019, in the Italian Patent and Trademark Office ("IPTO"), the entire contents of which are incorporated herein by reference.

TECHNICAL FIELD

The present invention relates to a method of recognizing coffee preferably stored in a hopper of a grinder or grinder-doser. The present invention also relates to an apparatus and a system for recognizing coffee.

BACKGROUND ART

The equipment required for the preparation of the coffee cups, i.e. the grinder and the coffee machine, must be suitably regulated. Coffee beans have peculiar characteristics that should be accounted for when calibrating and programming the equipment. Namely, account must be taken of the blend in use, the degree of roast of the blend and, last but not least, the date of packaging of the coffee in the package. For this reason, each type of coffee in use must be suitably ground by a specific grinder-doser and treated with pressurized hot water with given pressure and temperature values.

In particular, in order to prevent the hoppers of grinders associated with a certain blend from being erroneously fed with a blend other than that associated therewith during calibration, various solutions have been developed.

For example, EP 2314188 by the Applicant hereof discloses a conventional coffee machine in which, as the portafilter is removed from a dispenser unit, the grinder-doser associated with such unit is actuated.

Another example is the system for grinding and dispensing coffee as disclosed in WO 2016075147 in which a sensor is provided for detecting the concentration of total volatile organic compounds (TVOC) released from the coffee.

Problems of the Prior Art

If the hopper a coffee grinder were erroneously replenished with a coffee other from the initial one, the grinder and the dispenser unit would prepare the beverage without modifying the parameters of the preparation (particle size and dose of coffee, pressure and temperature of hot water), which would result in a product with different organoleptic properties being dispensed into the cup.

The devices of the prior art are not able to discriminate a blend in use from a reference blend whose concentration spectrum is stored in simplified form in the central control unit of one of the devices being used.

In addition, the sensors used for example in WO 2016075147, do not recognize the blend in the coffee grinder but only determine the intensity of the smell released from the coffee. Therefore, the prior art sensors would not be able to discriminate between two blends having the same TVOC.

OBJECT OF THE INVENTION

The object of the present invention is to provide a method, an apparatus and a system that can obviate the above discussed drawbacks of the prior art.

In particular, it is an object of the present invention to provide a method that can discern different types of coffee and warn the operator of any anomaly.

The aforementioned technical purpose and objects are substantially fulfilled by a method of recognizing coffee, an apparatus and a system that comprise the technical features as disclosed in one or more of the accompanying claims.

Benefits of the Invention

Advantageously, the method, the apparatus and the system of the present invention can detect of one or more specific volatile organic compounds released from the coffee stored in the hopper.

Advantageously, the method, the apparatus and the system of the present invention can recognize the coffee stored in the hopper from a plurality of reference types of coffee.

Advantageously, the method, the apparatus and the system of the present invention can warn the bartender or operator if the hopper contains a coffee other than the one that has been predetermined.

BRIEF DESCRIPTION OF FIGURES

Further features and advantages of the present invention will result more clearly from the illustrative, non-limiting description of a preferred, non-exclusive embodiment of a method, a machine and a system for recognizing coffee as shown in the accompanying drawings.

DETAILED DESCRIPTION

Although this is not expressly shown, the individual features described with reference to each embodiment shall be intended as auxiliary and/or interchangeable with other features, as described with reference to other embodiments.

Figure 1:
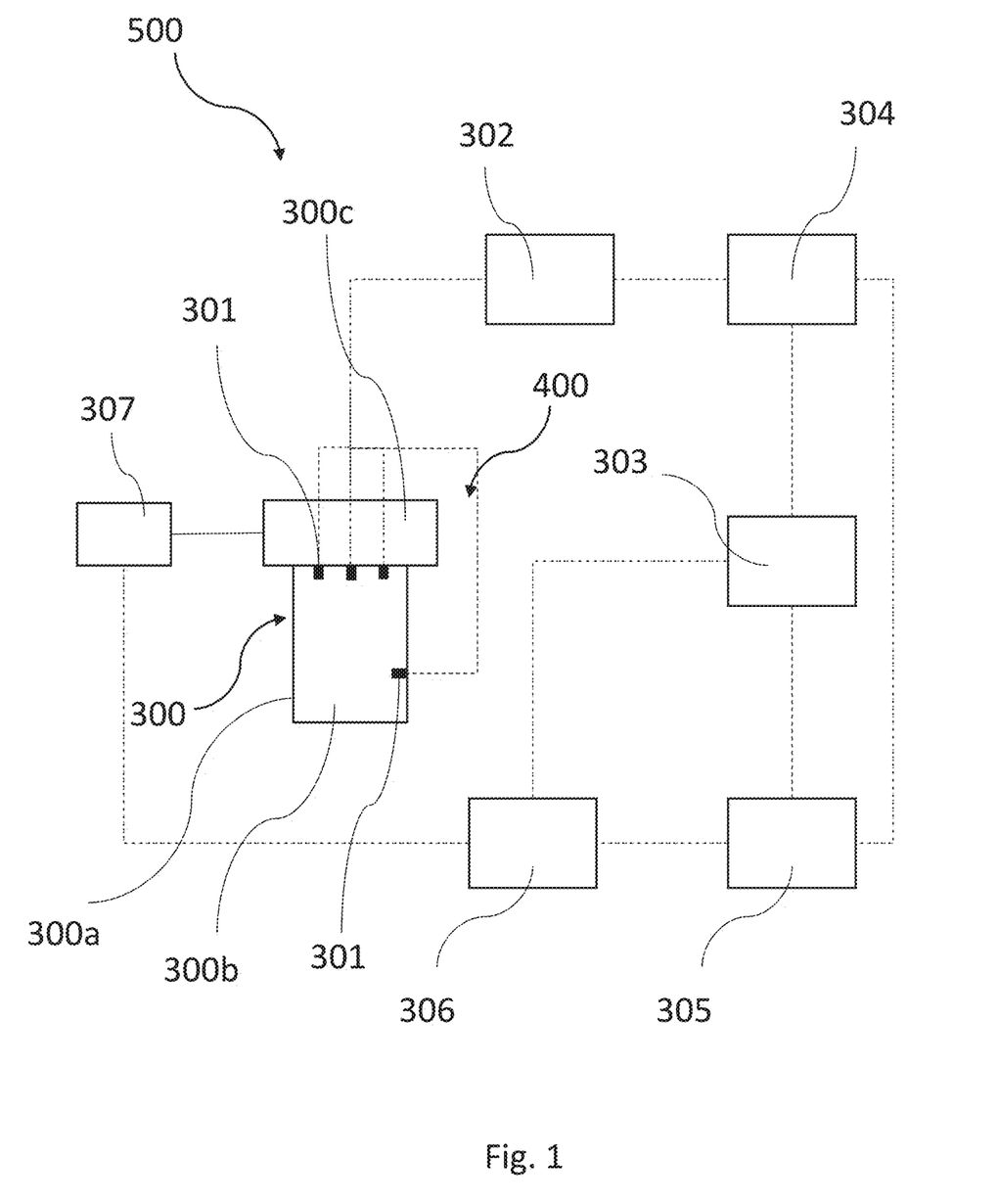
FIG. 1 shows a diagrammatic view of the machine for recognizing coffee according to the present invention.

The present invention relates to a method of recognizing a type of coffee from a plurality of reference types of coffee having a reference signal associated therewith. Preferably, the coffee to be recognized is contained in a hopper 300 associated with a grinder or a grinder-doser or an espresso machine. In particular, the hopper 300 is part of a coffee grinding and/or dosing device.

The method comprises the steps as set forth hereinbelow, performed according to a preferred embodiment.

The method of recognizing a type of coffee comprises the step of sensing, by one or more sensors 301, the presence and concentration of one or more volatile organic compounds in a mixture of volatile organic compounds released from the coffee, preferably held within the hopper 300. This step of sensing may be carried out periodically as directed by a user and/or alternatively as directed by a control unit.

In particular, it shall be noted that the volatile organic compounds released from the coffee in a container, preferably a hopper, are characteristic of the type of coffee, either single-origin or blend. In detail, each type of coffee releases a plurality of volatile organic compounds in different concentrations, that can be recognized, for example, by means of gas chromatography-mass spectrometry.

Figure 4:
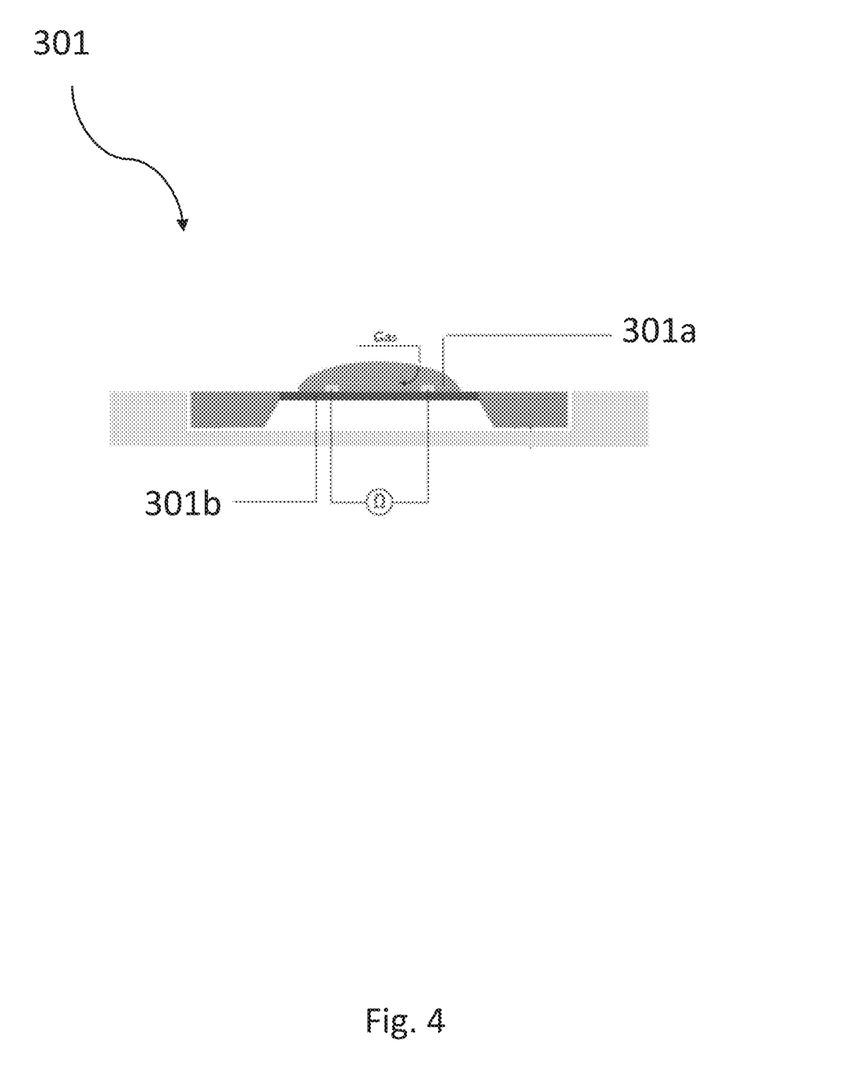
FIG. 4 shows a diagrammatic view of a sensor of the present invention.

According to a preferred embodiment, each sensor 301 has a nominal electrical resistance R0 and is configured to record a variation in the electrical resistance ΔR from the nominal resistance R0 when at least one volatile organic compound is released from the coffee in the hopper 300. In particular, each sensor 301 is configured to record the presence and concentration of certain specific organic compounds.

Preferably, each sensor 301 comprises a chemically reactive surface 301a configured to record the electrical resistance variation in the presence of one or more volatile organic compounds. In particular, each sensor 301 comprises a heating element 301b configured to heat the chemically reactive surface 301a in a range of temperatures from 300° C. to 400° C., to record the electrical resistance variation in the presence of one or more organic compounds.

More preferably, the sensors 301 are configured to sense the presence and concentration of at least the following volatile organic compounds: pyrazine derivatives, furan derivatives, carboxylic acids, pyrrole derivatives, furfural derivatives and pyridine derivatives. This list of volatile organic compounds is characteristic of the various types of coffee. In particular, the discrimination between types is associated with the concentration of the above listed volatile organic compounds.

In particular, the number of sensors ranges from one to four, preferably from one to eight. According to a preferred embodiment, the materials of the sensors are selected from $SnO_2$, $SnO_2Au$ with Au, CuO and $SnO_2Au$.

The step of sensing, by one or more sensors 301, the presence and concentration of one or more volatile organic compounds comprises the sub-step of measuring, for each sensor, the variation in the electrical resistance with time. In particular, the measurement of electrical resistance variation is carried out during a predetermined time that ranges from 0.5 seconds to 10 minutes, preferably from 1 to 5 minutes.

Figure 2:
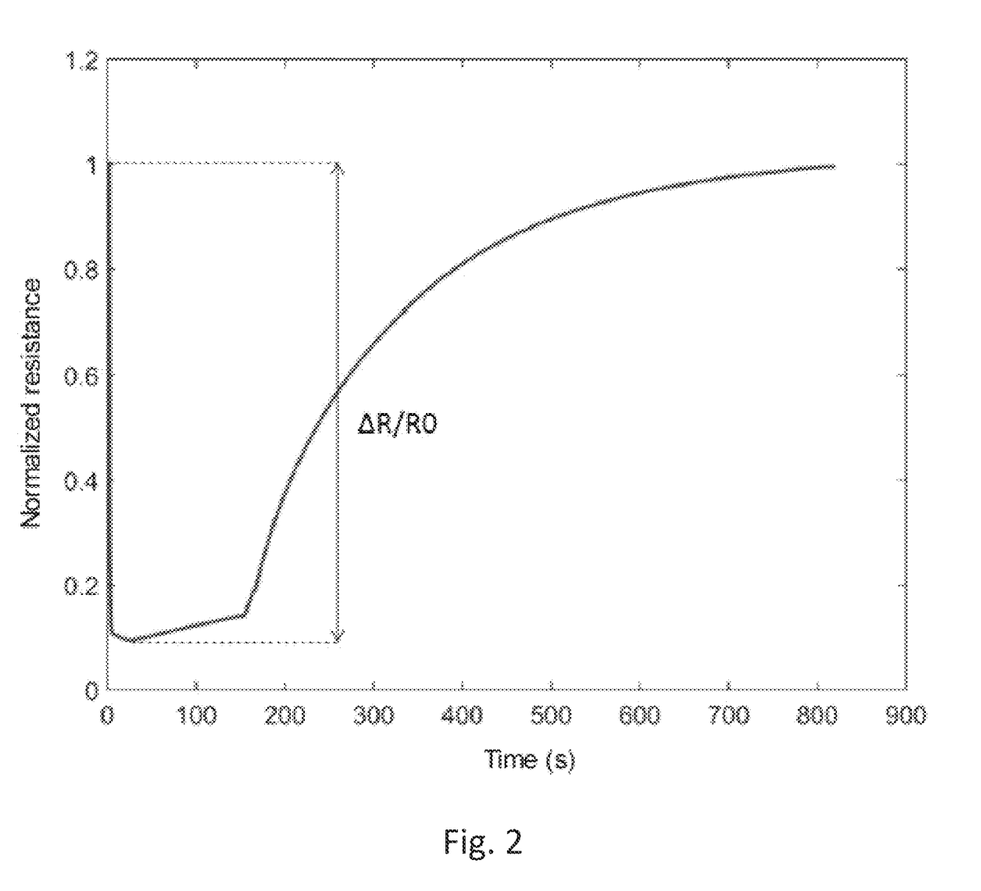
FIG. 2 shows a curve of the electrical resistance of a sensor as used in the method, the apparatus and the system of the present invention.

The step of sensing, by one or more sensors 301, the presence and concentration of one or more volatile organic compounds comprises the sub-step of normalizing each measured variation of the electrical resistance ΔRn to the nominal resistance R0 of the sensor to generate a normalized electrical resistance variation. An example of the normalized electrical resistance variation ΔRn according to the present invention is shown in FIG. 2.

Figure 3:
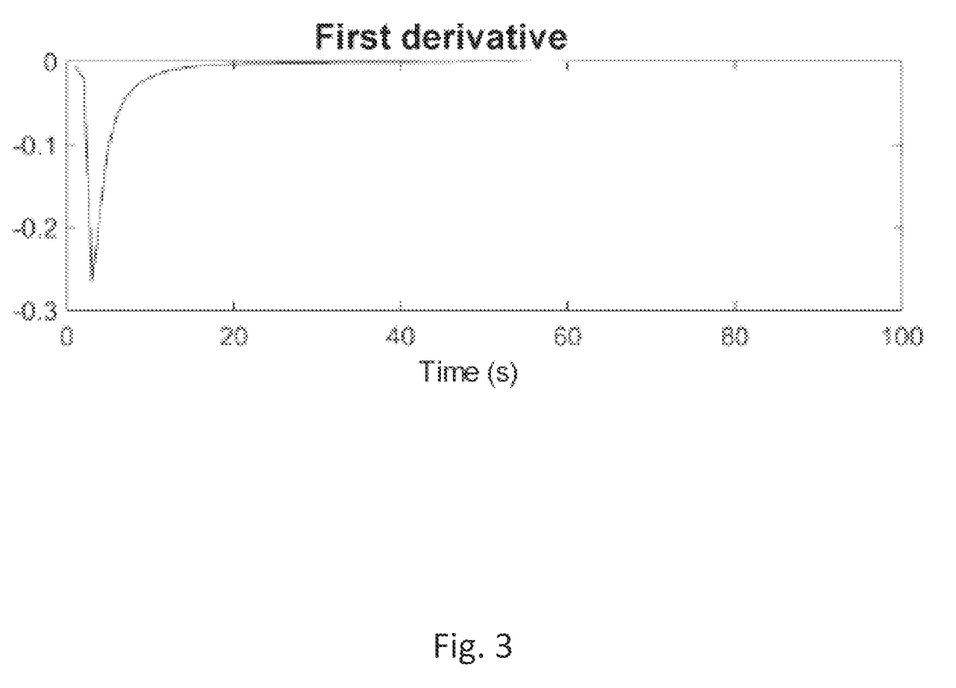
FIG. 3 shows the graph of the first derivative of FIG. 2.

According to a preferred embodiment, the step of sensing, by one or more sensors 301, the presence and concentration of one or more volatile organic compounds comprises the sub-step of calculating, for at least one sensor, the first derivative dRn with respect to the time of at least one normalized variation, as shown in FIG. 3. Then, the step of sensing comprises the sub-step of calculating the minimum value of the minimum Min of the calculated derivative.

The step of sensing, by one or more sensors 301, the presence and concentration of one or more volatile organic compounds comprises the sub-step of sensing at least each variation in the measured resistance ΔR to a data processing unit. In particular, each sensor 301, is in signal communication with the data processing unit 303, sends at least the variations in the measured resistance ΔR via a first data sending and receiving unit 302, optionally each sensor 301 sends the normalized variation ΔRn, the first derivative of the normalized variation dRn and the respective minimum value Min that has been calculated.

It shall be noted that optionally the sub-step of normalizing, the sub-step of calculating the first derivative and the sub-step of calculating the minimum of the first derivative are carried out by a data processing unit 303 in response to the first data sending and receiving unit 302 sending the variation in the electrical resistance as measured with time.

The method of recognizing a type of coffee comprises the step of generating a signal representative of the coffee contained in the hopper 300 according to the volatile organic compounds that have been sensed and their respective concentrations. In particular, the step of generating the representative signal is carried out by the data processing unit 303 upon reception of the data sent from each sensor 301.

The step of generating a coffee-representative signal comprises the sub-step of processing each normalized variation ΔRn, the first derivative of the normalized variation dRn and the calculated value of the minimum Min.

According to a preferred embodiment comprising at least four sensors 301, the signal representative of the coffee in the hopper is generated by processing the normalized variation ΔRn for each sensor in use and the minimum of the first derivative Min for at least three of the four sensors in use.

The method of recognizing a type of coffee comprises the step of comparing the coffee-representative signal with a reference signal associated with each reference type of coffee. In particular, the reference signal is obtained by analyzing a plurality of reference types of coffee with one or more sensors as described hereinbefore. In detail, the reference signal is associated with the presence and the concentration of one or more volatile organic compounds released from one respective reference type of coffee.

The step of generating a representative signal and the step of comparing the representative signal are carried out using a neural network-based algorithm. In particular, the neural network analyzes the normalized variations ΔRn and the derivatives of normalized resistance dRn, in particular the calculated values of the minimum Min, and thereby generates the signal representative of the type of coffee. Neural networks finally compare this generated representative signal with each reference signal, to thereby recognize the coffee in the hopper 300 from the plurality of reference types of coffee.

The neural network-based algorithm, which preferably resides in the data processing unit 303, undergoes a training process. In particular, the algorithm is trained to recognize a plurality of types of coffee by associating each reference type of coffee with the presence and concentration of one or more volatile organic compounds released from respective reference types of coffee. In detail, the neural network algorithm is trained to recognize a certain type of coffee as a function of the presence and concentration of certain organic compounds being released. For the purposes of the present invention, the neural network is trained with the variations of normalized electrical resistance and the minimum values of a plurality of reference types of coffee as described above concerning the method of recognizing a type of coffee from a plurality of reference types of coffee having a reference signal associated therewith.

By this arrangement, the neural network algorithm "learns" to recognize a type of coffee from the variations in the normalized electrical resistance and from the first derivatives of the variation in the normalized electrical resistance and in particular the minimum values calculated for a plurality of reference types of coffee.

It shall be noted that the neural network algorithm defines tolerance ranges according to the reference types of coffee used during the training process. Thus, the neural network recognizes a coffee even if the generated signal for the coffee in the hopper does not match the reference signal, because it falls within a tolerance range predetermined and/or defined by the neural network.

Preferably, the neural network algorithm may be periodically updated by training it with additional reference types of coffee. According to a preferred embodiment of the present invention, the plurality of reference types of coffee include single-origin coffee and blends of coffee, either fresh or at various stages of storage within a hopper, which is known to the skilled person as old coffee.

In detail, during the step of generating a representative signal, the neural network algorithm receives the normalized variation $\Delta Rn$ and the calculated minimum of the derivative Min and generates the signal representative of the reference coffee. The step of comparing the representative signal with the reference signals is carried out by the neural network algorithm, preferably at the same time as the step of generating the representative signal, to thereby identify the type of coffee contained in the hopper 300.

The method of recognizing a type of coffee comprises the step of generating a recognition signal in response to the comparison of the generated representative signal with the reference signals. In particular, the recognition signal carries the information concerning the type of coffee in the hopper.

The method of recognizing a type of coffee comprises the step of generating a proper-use signal when the recognition signal matches a preset reference signal as a function of the tolerance ranges of the neural network and of generating an alarm signal when the representative signal differs from the preset reference signal as a function of the tolerance ranges of the neural network. Preferably, the recognition signal, the proper-use signal and the warning signal are stored in the data processing unit.

In particular, the step comprises a sub-step of sending the recognition signal, the proper-use signal and the alarm signal to a user interface 305 via a second data sending and receiving unit 304. By this arrangement a user may consult the stored signals at later times and process them according to his/her own interests. The user interface 305 preferably comprises an application, residing in a mobile or fixed device and/or a display associated with the hopper 300.

The step of generating a proper-use or alarm signal comprises a sub-step of processing a text message associated with the alarm signal and the proper-use signal respectively. It shall be noted that the message can be customized by a user with the conventional steps known to the skilled person. This message may be, for example, as follows:

"Right coffee" if the signal is the proper-use signal,
"Wrong coffee" if the signal is the alarm signal;
"Old coffee" if the signal is the alarm signal and the coffee that has been sensed in the hopper 300 is recognized as old.

The step of generating a proper-use or alarm signal further comprises the sub-step of displaying the text message processed on the user interface 305. In a practical example, the processing unit 303 is configured to send the message to the user interface 305 as follows:

via SMS and/or email;
as a pop-up on the display associated with the hopper 300.

Advantageously, a message associated with the alarm signal will be displayed to warn the user of the presence of a wrong type of coffee in the hopper 300.

The method of recognizing a type of coffee comprises a step of controlling a grinder, a grinder-doser or an espresso machine, preferably coupled to the hopper 300. In particular, the step of controlling is carried out by a control unit 306 associated with a grinder, a grinder-doser or an espresso machine. This control unit, 306, which is in signal communication with the data processing unit 303 and/or with the second data sending and receiving unit 304, is configured to enable and disable a grinder, a grinder-doser or an espresso machine in case of generation of an alarm signal. In detail, the step of controlling comprises the sub-steps of:

receiving the proper-use signal and the alarm signal;
generating a lock signal if the control unit, 306 receives an alarm signal and later generating a signal for restarting sensing of the presence and of the concentration of volatile organic compounds in the hopper after a predetermined waiting time,
generating a start signal if the control unit, 306 receives a proper-use signal,
generating a signal for changing the grinding parameters if the coffee in the hopper 300 is sensed as old. It shall be noted that the change of the grinding parameters is associated with the type of coffee and aging. Preferably the change of the parameters can be adjusted by a user.

According to one embodiment, the method of recognizing a type of coffee may be used as part of a method of controlling the operation of a coffee grinding device if the hopper 300 is associated with a grinding device, not shown. In particular, the method of controlling the operation of a grinding device comprises the step of recognizing the coffee in the hopper 300 using the method of the present invention. Then, the method of controlling the operation of a coffee grinding device comprises the step of adjusting one or more parameters of the coffee grinding device according to the recognition signal, such as water temperature and pressure or brewing time.

According to a further embodiment, the method of recognizing a type of coffee may be used as part of a method of controlling the operation of a coffee machine if the hopper is incorporated in an espresso machine. In particular, the method of controlling the operation of a coffee machine comprises the step of recognizing the coffee in the hopper 300 using the method of the present invention. Then, the method of controlling the operation of a coffee machine comprises the step of adjusting one or more coffee preparation parameters according to the recognition signal, such as water temperature and pressure or brewing time.

In the methods for controlling the operation of a grinding device and a coffee machine, parameters are adjusted also according to the sensed aging.

Preferably the step of controlling comprises the sub-step of cleaning each sensor 301. In particular, the control unit 306 is in signal communication with cleaning means 307 configured to clean each sensor 301. In detail, the control unit 306 is configured to periodically generate a trigger signal to trigger the cleaning means 307. More in detail, the control unit 306 triggers a sub-step of cleaning the sensor by blowing air at each sensor to restore the electrical resistance to the nominal resistance conditions R0.

The present invention further relates to an apparatus for recognizing a type of coffee 400 from a plurality of reference types of coffee having a respective reference signal associated therewith.

The apparatus for recognizing a type of coffee 400 comprises the hopper 300 for storing coffee beans or ground coffee. In particular, the hopper comprises a base 300a defining a cavity 300b and a cover 300c removably associated with the base 300a.

Preferably, such hopper 300 is a coffee grinding and/or dosing device.

The apparatus comprises a plurality of sensors 301 configured to sense the presence and the concentration of one or more volatile organic compounds released from the coffee held within the cavity 300b of the hopper 300. In particular, each sensor is configured to generate a signal representative of the volatile organic compounds that have been sensed and their respective concentrations. Each sensor 301 has a nominal electrical resistance R0 and is configured to record a variation in the electrical resistance ΔR from the nominal resistance R0 when at least one volatile organic compound is released from the coffee in the hopper. Preferably, each sensor is of the above discussed type.

The machine comprises the data sending and receiving unit 302 in signal communication with the plurality of sensors and configured to send the data generated by the plurality of sensors 301.

According to one embodiment, the sensors 301 are associated with the cover 300c of the hopper. Alternatively, one or more sensors 301 are associated in a housing formed in the base 300a of the hopper 300. Alternatively, the sensors 301 are placed outside the hopper 301, e.g. at the base 401a and are connected to the cover 300c via a pipe, not shown. According to a preferred embodiment as shown in the figures the sensors 301 are arranged in the base 300a and on the cover 300c.

The present invention further relates to a system for recognizing a type of coffee 500 from a plurality of reference types of coffee, each type of coffee being associated with a respective reference signal.

The system for recognizing a type of coffee 500 comprises an apparatus for recognizing a type of coffee 400 as described hereinbefore.

The system for recognizing a type of coffee 500 comprises a second data sending and receiving unit 304 in signal communication with the first data sending and receiving unit 302 and a data processing unit 303. In particular, the second data sending and receiving unit 304 is configured to receive the signals generated by the plurality of sensors 301 and preferably to send them to the data processing unit 303. The latter, for the purposes of the present invention, is configured to:
  generate a signal representative of the coffee contained in the hopper 300 according to the volatile organic compounds that have been sensed and their respective concentrations,
  compare the signal so generated with the reference signals associated with each reference type of coffee,
  generate a recognition signal in response to the comparison of the generated signal with the reference signals,
  generate a proper-use signal when the recognition signal corresponds to a preset reference signal;
  generate an alarm signal when the representative signal differs from the preset reference signal.

Preferably, the recognition system 500 comprises a user interface 305 in signal communication with the data processing unit 303 and the second data sending and receiving unit 304.

In a preferred embodiment, the recognition system 500 comprises a control unit 306 is in signal communication with the data processing unit 303 and/or with the second data sending and receiving unit 304. Preferably, the control unit 306 is of the type described above, which is configured to:
  receive the proper-use signal and the alarm signal;
  generate a lock signal if the control unit, 306 receives an alarm signal and later generating a signal for restarting sensing of the presence and of the concentration of volatile organic compounds in the hopper after a predetermined waiting time,
  generate a start signal if the control unit, 306 receives a proper-use signal,
  generate a signal for changing the grinding parameters if the coffee in the hopper 300 is sensed as old.

In the preferred embodiment, the system also comprises cleaning means 307 which are configured to periodically clean each sensor 301. Namely, the control unit 306 is configured to control the cleaning means 307.

The invention claimed is:

1. A method of recognizing a type of coffee from a plurality of reference types of coffee, wherein each of the reference types of coffee is associated with a respective reference signal and wherein each type of coffee is associated to a characteristic combination of volatile organic compounds released from the type of coffee, the method comprising:
  sensing, by one or more sensors, presence and concentration of one or more volatile organic compounds in a mixture of volatile organic compounds released from the type of coffee;
  generating a signal representative of the type of coffee according to the sensed one or more volatile organic compounds and the respective concentrations of the sensed one or more volatile organic compounds;
  comparing the generated signal with the reference signal associated with each of the reference types of coffee; and
  generating a recognition signal in response to the comparing of the generated signal with the reference signals.

2. The method of claim 1, wherein the type of coffee is contained in a hopper of a coffee grinding device, coffee dosing device, or coffee grinding and dosing device,
  wherein the sensing of the presence and concentration of the one or more volatile organic compounds senses the presence and concentration of the one or more volatile organic compounds in the mixture of the volatile organic compounds released from the type of coffee in the hopper, and
  wherein the generating of the recognition signal generates the signal representative of the type of coffee contained in the hopper according to the sensed one or more volatile organic compounds and the respective concentrations of the sensed one or more volatile organic compounds.

3. The method of claim 2, wherein each of the one or more sensors has a nominal electrical resistance, and
  wherein each of the one or more sensors is configured to record a variation in electrical resistance from the nominal electrical resistance when at least one of the one or more volatile organic compounds is released from the type of coffee in the hopper.

4. The method of claim 3, wherein the sensing of the presence and concentration of the one or more volatile organic compounds comprises, for each of the one or more sensors:
  measuring the variation in the electrical resistance with time; and
  normalizing each measured variation in the electrical resistance from the nominal electrical resistance of the respective sensor to generate a normalized electrical resistance variation.

5. The method of claim 4, wherein the sensing of the presence and concentration of the one or more volatile organic compounds further comprises, for at least one of the one or more sensors:

calculating a first derivative with respect to the time of the normalized electrical resistance variation; and calculating a minimum value of the first derivative so calculated.

6. The method of claim 5, wherein the generating of the signal representative of the type of coffee comprises:

processing the normalized electrical resistance variations with the minimum values of the calculated first derivatives.

7. The method of claim 1, wherein the generating of the signal representative of the type of coffee and the comparing of the generated signal with the reference signal are carried out using a neural network-based algorithm.

8. The method of claim 7, wherein the neural network-based algorithm is trained to recognize a plurality of types of coffee by associating each of the reference types of coffee with the presence and concentration of the one or more volatile organic compounds released from the respective reference types of coffee.

9. The method of claim 1, further comprising:

generating a proper-use signal when the recognition signal corresponds to a preset reference signal; and generating an alarm signal when the signal representative of the type of coffee differs from the preset reference signal.

10. A method of controlling operation of a coffee grinding device, the method comprising:

recognizing the type of coffee in the hopper using the method of claim 2; and adjusting one or more operating parameters of the coffee grinding device according to the recognition signal.

11. A method of controlling operation of a coffee machine the method comprising:

recognizing the type of coffee in the hopper using the method of claim 2; and adjusting one or more operating parameters of the coffee machine according to the recognition signal.

12. An apparatus for recognizing a type of coffee from a plurality of reference types of coffee, wherein each of the reference types of coffee is associated with a respective reference signal and wherein each type of coffee is associated to a characteristic combination of volatile organic compounds released from the type of coffee, the apparatus comprising:

a hopper of a coffee grinding device, coffee dosing device, or coffee grinding and dosing device, the hopper comprising a base that defines a cavity to store the type of coffee and a cover that is configured to be releasably associated with the base to close the cavity; and a plurality of sensors configured to sense presence and concentration of one or more volatile organic compounds released from the type of coffee stored in the hopper, wherein each of the sensors is configured to generate a signal representative of the sensed one or more volatile organic compounds and the respective concentrations of the sensed one or more volatile organic compounds;

wherein each of the sensors has a nominal electrical resistance, and wherein each of the sensors is configured to record a variation in the electrical resistance from the nominal electrical resistance when at least one volatile organic compound is released from the type of coffee in the hopper.

13. The apparatus of claim 12, wherein the sensors are associated with the cover of the hopper, the base of the hopper, or the cover of the hopper and the base of the hopper.

14. The apparatus of claim 12, further comprising:

a first data sending and receiving unit in signal communication with the sensors and configured to send the signals generated by the sensors.

15. A system for recognizing a type of coffee from a plurality of reference types of coffee, wherein each of the reference types of coffee is associated with a respective reference signal and wherein each type of coffee is associated to a characteristic combination of volatile organic compounds released from the type of coffee, the system comprising:

an apparatus for recognizing the type of coffee from a plurality of reference types of coffee, the apparatus comprising:

a hopper of a coffee grinding device, coffee dosing device, or coffee grinding and dosing device, the hopper comprising a base that defines a cavity to store the type of coffee and a cover that is configured to be releasably associated with the base to close the cavity;

a plurality of sensors configured to sense presence and concentration of one or more volatile organic compounds released from the type of coffee stored in the hopper, wherein each of the sensors is configured to generate a signal representative of the sensed one or more volatile organic compounds and the respective concentrations of the sensed one or more volatile organic compounds;

a first data sending and receiving unit in signal communication with the sensors and configured to send the signals generated by the sensors;

a second data sending and receiving unit in signal communication with the first data sending and receiving unit and configured to receive the signals sent by the sensors; and a data processing unit in signal communication with the second data sending and receiving unit and configured to:

generate a signal representative of the type of coffee contained in the hopper according to the sensed one or more volatile organic compounds and the respective concentrations of the sensed one or more volatile organic compounds;

compare the generated signal with the reference signal associated with each of the reference types of coffee;

generate a recognition signal in response to the comparing of the generated signal with the reference signals;

generate a proper-use signal when the recognition signal corresponds to a preset reference signal; and generate an alarm signal when the signal representative of the type of coffee differs from the preset reference signal.

16. The method of claim 1, wherein the type of coffee is contained in a hopper of a coffee machine, wherein the sensing of the presence and concentration of the one or more volatile organic compounds senses the presence and concentration of the one or more volatile organic compounds in the mixture of the volatile organic compounds released from the type of coffee in the hopper, and wherein the generating of the recognition signal generates the signal representative of the type of coffee contained in the hopper according to the sensed one or more volatile organic compounds and the respective concentrations of the sensed one or more volatile organic compounds.

17. The method of claim 5, wherein the generating of the signal representative of the type of coffee comprises:
processing the normalized electrical resistance variation with the minimum value of the calculated first derivative.

18. The method of claim 1, wherein the generating of the signal representative of the type of coffee is carried out using a neural network-based algorithm.

19. The method of claim 1, wherein the comparing of the generated signal with the reference signal is carried out using a neural network-based algorithm.

20. A method of controlling operation of a coffee dosing device, the method comprising:
recognizing the type of coffee in the hopper using the method of claim 2; and
adjusting one or more operating parameters of the coffee dosing device according to the recognition signal.

* * * * *